Feb. 11, 1941. W. H. MUSSEY 2,231,841
LATERAL MOTION TRUCK BRAKE
Original Filed June 20, 1938 5 Sheets-Sheet 5
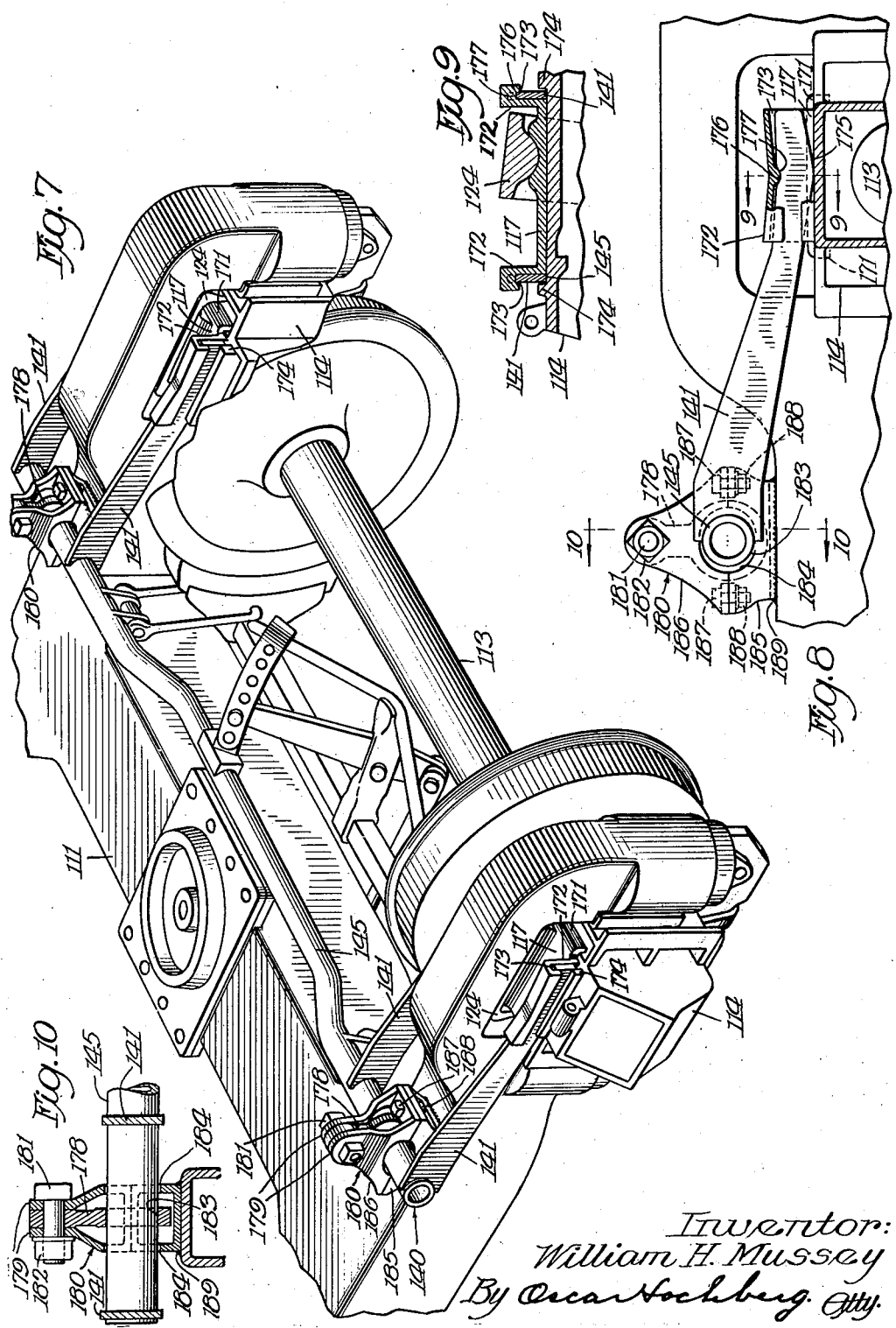
Inventor:
William H. Mussey
By Oscar Hochberg, Atty.

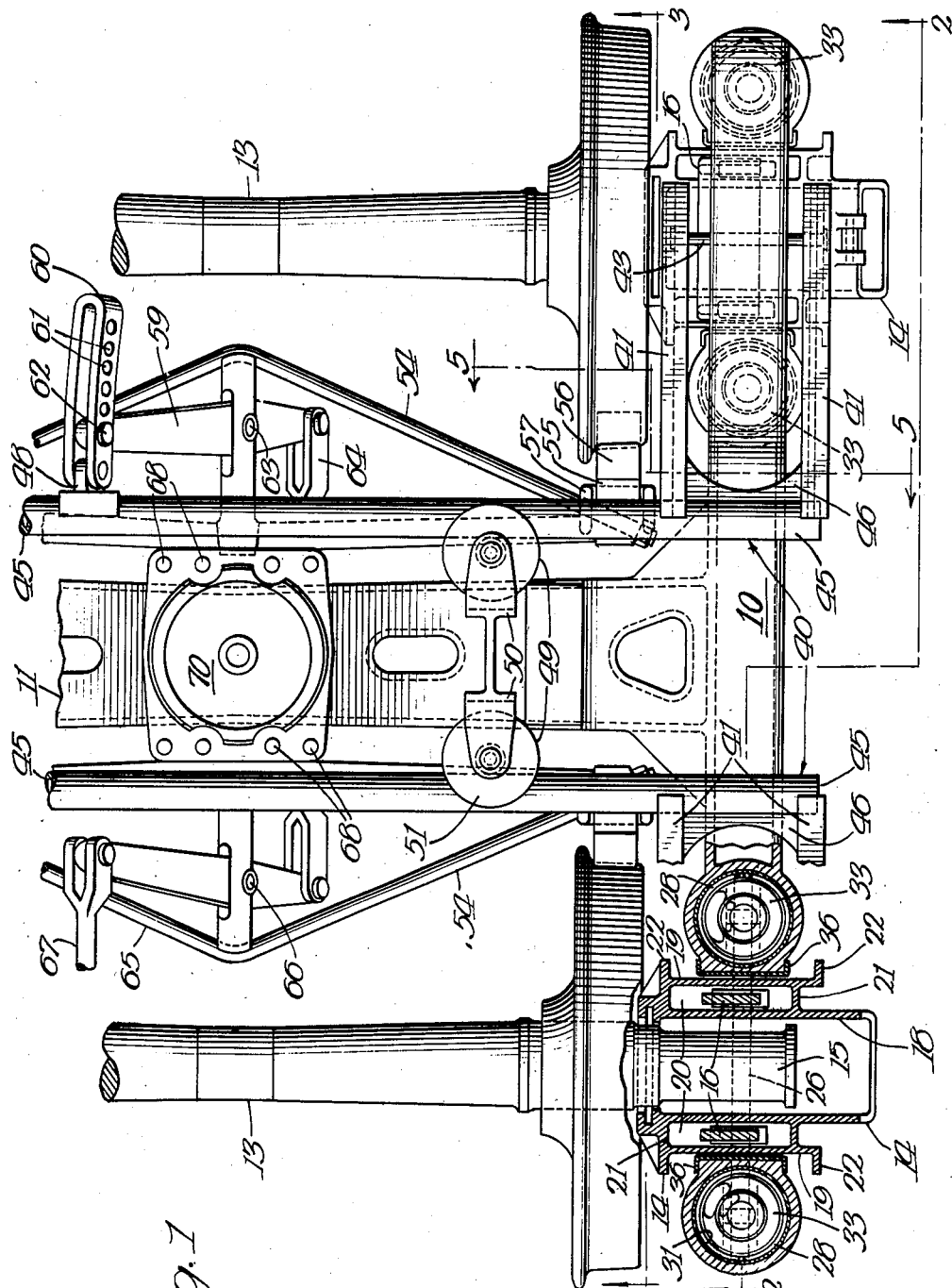

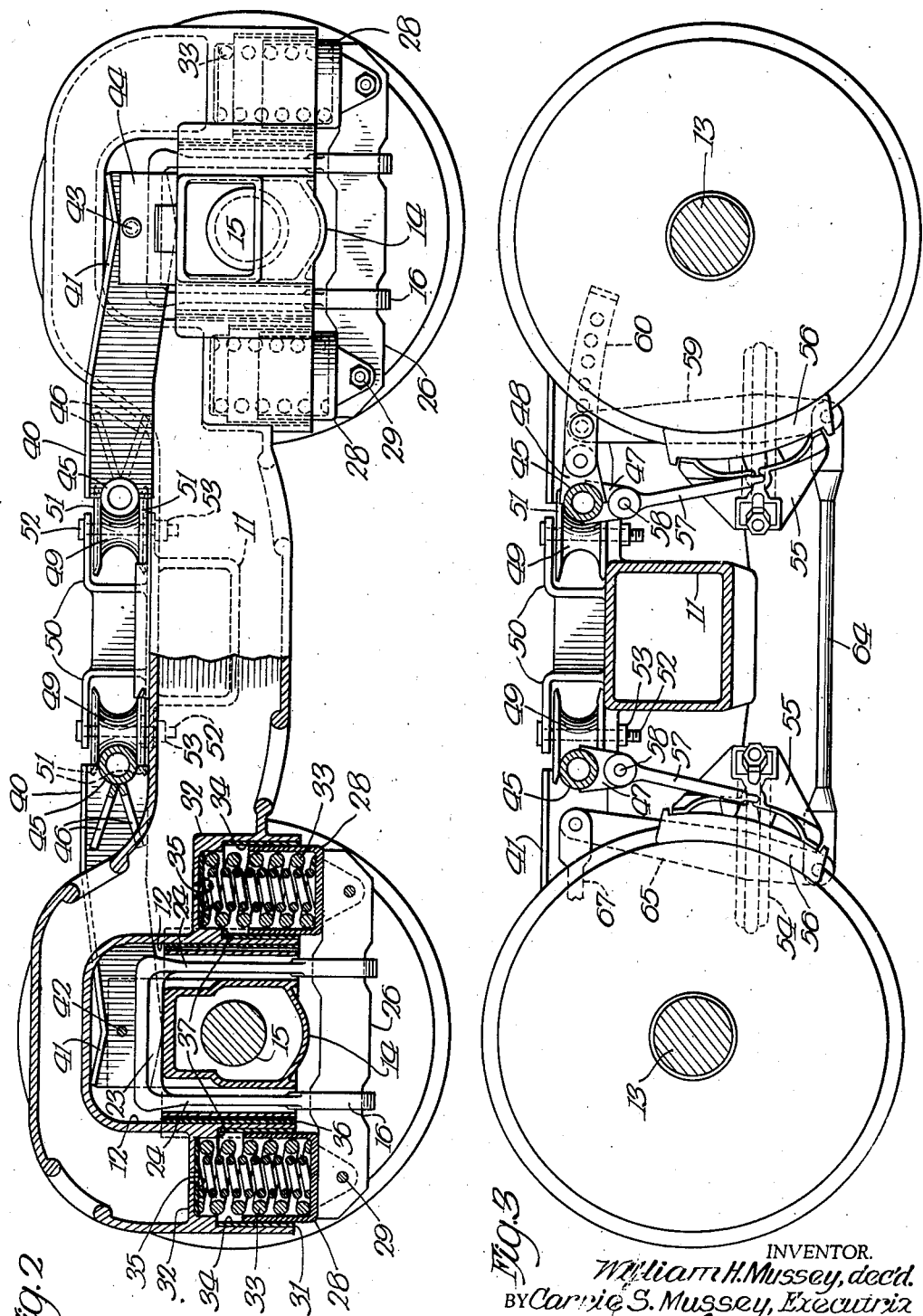

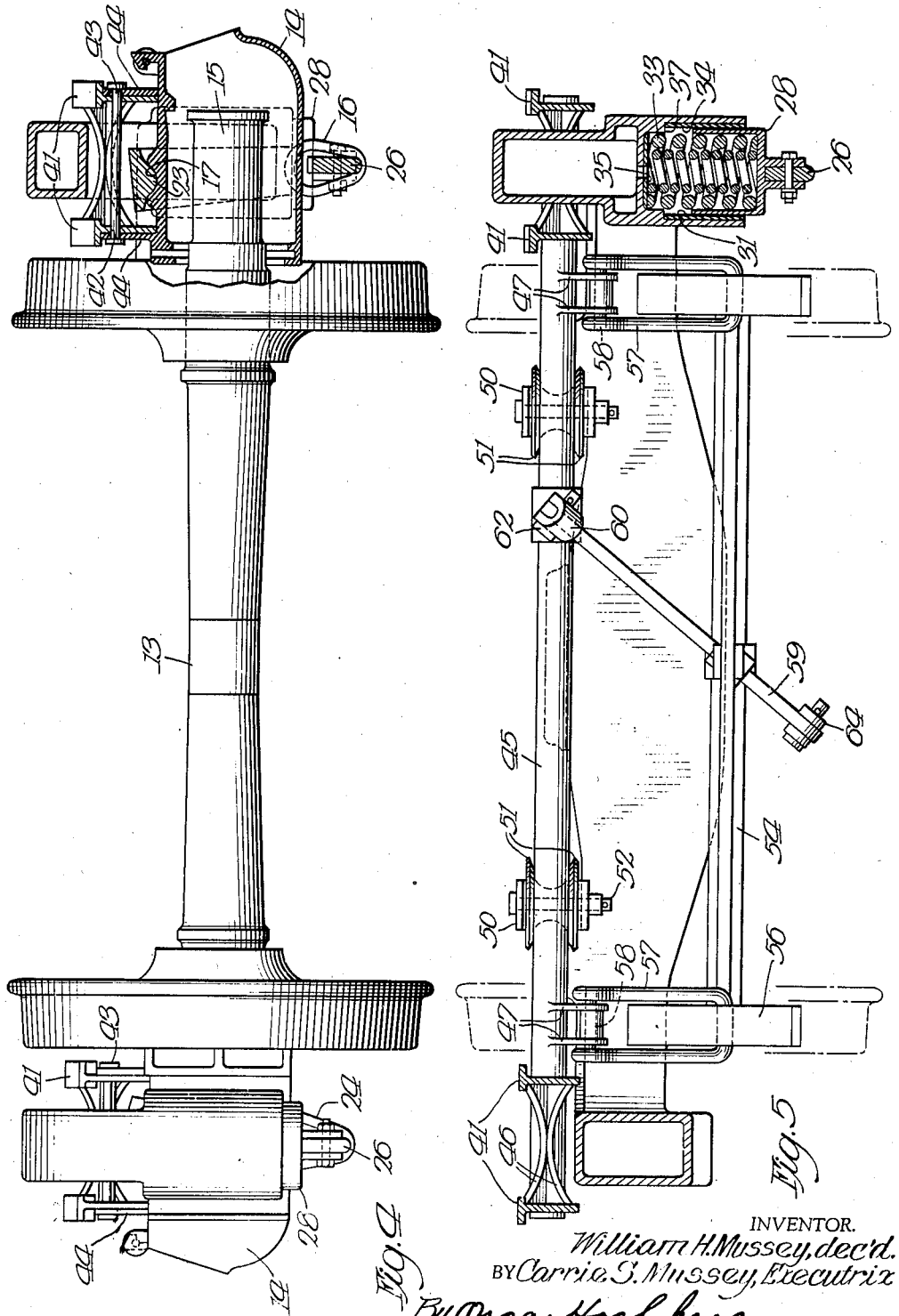

/ Patented Feb. 11, 1941

2,231,841

UNITED STATES PATENT OFFICE 2,231,841

LATERAL MOTION TRUCK BRAKE

William H. Mussey, Chicago, Ill., assignor to Pullman-Standard Car Manufacturing Company, Chicago, Ill., a corporation of Delaware Original application June 20, 1938, Serial No. 214,673. Divided and this application July 13, 1939, Serial No. 284,269

8 Claims. (Cl. 188—207)

This application is a division of my copending application, Serial No. 214,673, filed June 20, 1938.

The invention relates to railway car trucks and, more particularly, to trucks of the pivotal type having wheel and axle assemblies laterally movable relative to the truck frame independently of one another, and to the provision of a brake rigging therefor.

The principal object of the invention is the provision of car trucks having axle box mountings affording direct lateral motion of the wheels and axles and brake-supporting structure movable coincidentally with the wheels and axles and having antifriction support on the truck.

The foregoing and other objects are obtained by the structure illustrated in the accompanying drawings, in which Fig. 1 is a plan view, partly in section, of a truck and brake rigging constructed in accordance with one form of this invention;

Fig. 2 is a side elevation of the truck, partly in section, taken on the line 2—2 of Fig. 1;

Fig. 3 is a sectional view taken on the line 3—3 of Fig. 1 just inside the truck side frame and showing the general details of the brake rigging;

Fig. 4 is an end elevational view of the truck, partly in section, showing the disposition of the swing hanger permitting lateral displacement of the truck frame with respect to the journal boxes and the pivotal connection of the brake rigging to the journal boxes whereby the brakes follow the movement of the wheels;

Fig. 5 is a transverse, sectional view taken on the line 5—5 of Fig. 1 and illustrating the brake-supporting arrangement at the truck transom;

Fig. 7 is a general perspective view of a portion of a truck and brake arrangement constructed in accordance with another form of the invention in which the brake-supporting structure is carried in hangers on the truck frame and provided with fulcrum points on the journal boxes as distinguished from direct pivotal connections and having separate swing hanger bearings on the journal box;

Fig. 8 is a fragmentary elevational view of the brake-supporting arrangement with parts broken away better to illustrate the fulcrum support on the journal box and the hanger connection on the truck frame;

Fig. 9 is a fragmentary sectional view through the journal box taken on the line 9—9 of Fig. 8 illustrating the separate swing hanger bearing on the journal box; and Fig. 10 is a fragmentary sectional view through a brake rigging supporting hanger assembly taken on the line 10—10 of Fig. 8.

Figure 6:
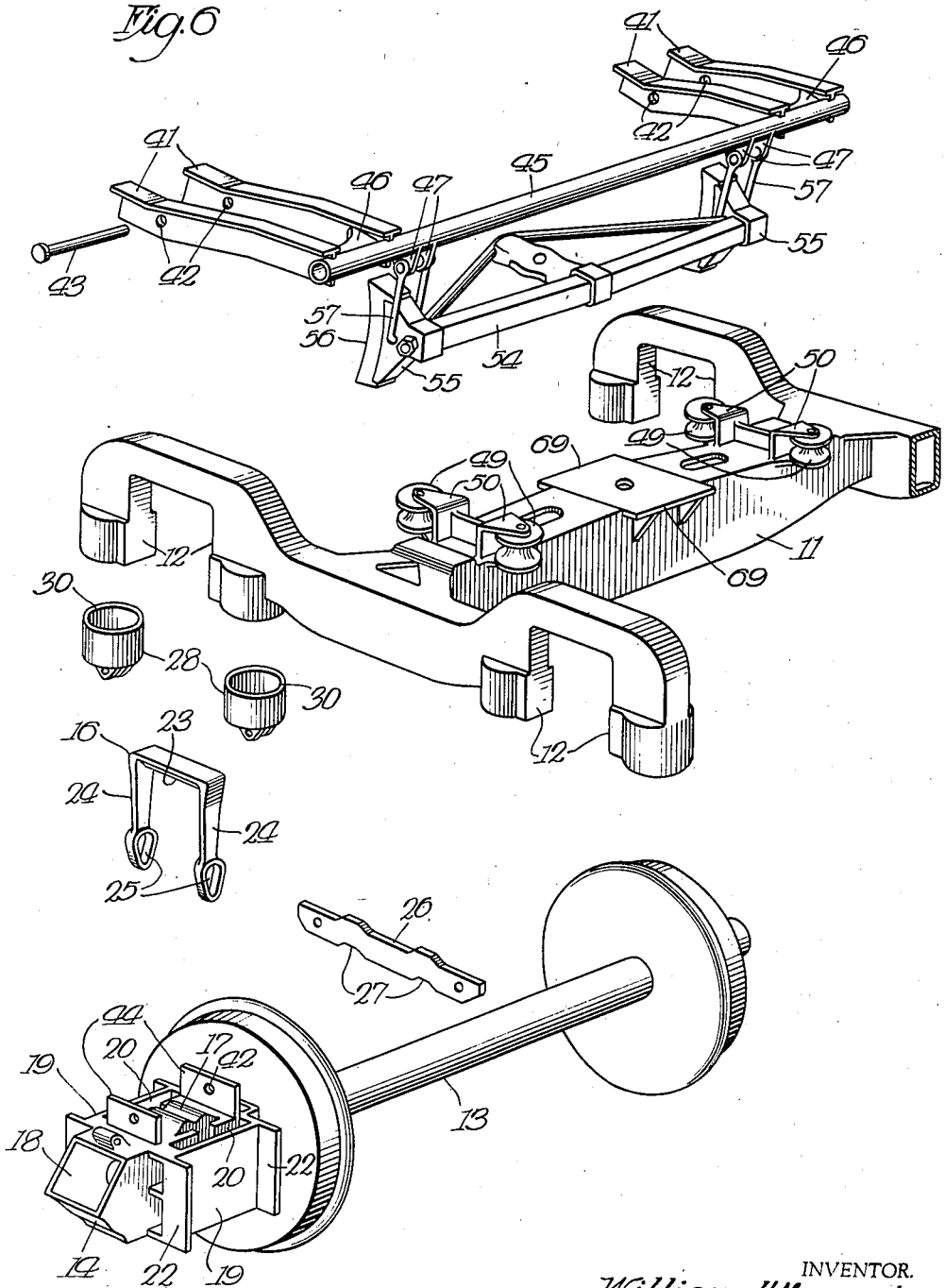
Fig. 6 is a general perspective view of all of the truck and brake parts in their relative associated positions for assembly.

In the drawings, 10 represents a car truck frame of any preferred construction but here illustrated as a rigid casting having integral transom 11 and pedestals 12. The truck frame is supported on spaced wheel and axle assemblies 13 entered between the respective, associated pairs of pedestals. Axle boxes 14 are disposed on the respective journals 15 of each axle and in position to be engaged by the respective pedestals. The axle boxes are constructed with an axle-engaging portion 18 forming the oil cellar, or box proper, and spaced pedestal ways 19 at opposite sides thereof providing through openings 20 extending the full height of the box. The pedestal ways 19 are, of course, integral with the box through the connecting walls 21 closing the openings 20 and are provided with flanges 22 between which the pedestals 12 engage the ways 19 and which limit the lateral swinging of the truck frame by contact with the pedestals. Swing hanger yokes 16 are supported on the journal boxes in bearings 17. The swing hangers have a complemental bearing portion 23 seated in the bearings 17 and depending legs 24 extending beneath the level of the bottom of the box through the openings 20, whereby they are free to swing without frictional engagement with either the journal box or pedestals and without interference. The swing hanger yokes at the bottom of the legs 24 have aligned openings 25 of generally inverted ovate shape through which spring seat supporting members 26 are inserted to be carried thereby in interlocked relation therewith.

Spring seats 28 are rigidly secured to these members by means of bolts 29 and are provided with vertically extended cylindrical walls 30 which enter complemental guide openings 31 in the respective pedestals. The openings 31 form spring pockets in the pedestals and have spring cap portions 32 which rest upon the multiple coil springs 33 seated in the spring seats 28 at opposite sides of the journal boxes. The interengaging relation of the pedestals and spring seats maintains the springs 33, the spring seats 28 and the spring seat supporting members 26 vertical at all times. Abutments 37 in the spring pockets 31 are adapted to engage the top edges of vertical walls 30 of the spring seats 28 during deflection of springs 33 to limit compression thereof to avoid compressing the springs solid.

The pedestals 12 are provided with hardened metal wear plates 36 secured thereto by welding and which engage the pedestal ways 19 of the journal boxes during relative lateral swinging and vertical oscillations of the parts. It is to be understood that during the operation of the truck it is the wheel and axle assemblies which move relative to the truck frame in response to deviations in the track, while the frame remains substantially steady. This may readily be permitted due to the absorption of lateral shocks directly at the journal box rather than transmission through the truck frame and then absorbed. The truck is adapted to support a vehicle body by means of center plate 70 and pivot with respect thereto; but, for all practical purposes, the lateral movement of the wheels and axles afforded by the swing hangers is sufficient to permit negotiation of all curves encountered in main line service without necessity for the truck swiveling.

Brake rigging is provided for co-operation with the wheels and supported from the wheel and axle assemblies and the truck frame for movement coincident with and in response to that of the wheels. The supporting mechanism for the brake rigging comprises generally U-shaped structures 40 disposed in oppositely extending relation and each having bifurcated leg members 41 straddling the truck side frames at the respective pedestal positions and pivotally connected to the respective journal boxes at 42 by means of pins or bolts 43. The journal boxes 14 are each constructed with integral upstanding lugs 44 to which these leg members are pivoted. These lugs are disposed at opposite sides of the swing hanger bearings 17, as best shown in Figs. 4 and 6. The spaced leg members 41 of each U-shaped structure are connected across the truck by means of a tubular cross member 45 to which the leg members are integrally secured by welding and braced by multiple web members 46 also secured between the respective bifurcated legs 41 by welding. Depending lugs 47 are welded to the cross members for supporting the brake rigging, and a bracket 48 is secured to one cross member for connection of a dead lever.

By means of the connection 42 to the journal boxes, the U-shaped supporting structures are movable transversely with the wheel and axle assemblies 13, and the cross members 45 are supported on the truck frame for readily permitting lateral movement relative thereto in response to axle movement. In this manner, the brake rigging is suspended in position properly to engage the wheels at all times. The cross members 45 are supported from the truck frame by anti-friction rollers 49 mounted in brackets 50 on the transom 11 at each side of the truck for each cross member. The brackets 50 are illustrated as integral with the truck frame, but may be built-up if desired. The rollers 49 are disposed in the brackets 50 with their axes preferably vertical, whereby flanges 51 confine the cross members 45 against the vertical reaction of the brake rigging when the brakes are applied. Bolts 52, secured in the brackets 50 by nuts 53, provide axles about which the rollers 49 rotate.

The brake rigging comprises a pair of brake beams 54 of usual construction, each having heads 55 secured to the opposite ends thereof with brake shoes 56 for engaging the respective wheels. The brake beams are suspended from the respective cross members 45 by means of hangers 57 taking the brake heads 55 and pivotally secured to the lugs 47 by pins 58, whereby the beams are positively moved with the brake-supporting structure and thereby with the wheels.

A dead lever 59 is connected at its upper end with the bracket 48 on one of the cross members 45 by means of a link 60 providing a plurality of manual adjustments for wear through the various openings 61 for the anchoring pin 62. Intermediate its ends, the dead lever is operatively connected at 63 to one of the brake beams and, at its lower ends, by means of a bottom connection 64, is connected with a live brake lever 65 which is connected intermediate its ends, as at 66, to the other brake beam. The live lever 65 is connected at its upper end with a pull rod 67 which is operatively associated with brake operating mechanism (not shown) mounted either on the truck or a vehicle body and by means of which the brakes function. A vehicle body may be pivotally associated with the truck by means of a supporting center plate 70 secured to flanges 69 of the transom 11 by means of rivets 68, and the combination of this pivotal association of the truck and car body with the lateral motion of the respective wheel and axle assemblies independently of one another, as afforded by the journal box swing hangers, provides an easy riding motion in negotiating curves and irregularities in the track and tends to smooth out roughness of the track and roadbed without transmitting excessive motion through the truck to the body.

The construction illustrated in Figs. 7 to 10, inclusive, aside from the brake-rigging-supporting structure, differs from that above described only in the provision of a separate swing hanger bearing 117 on the journal box 114. The bearing 117 is provided with depending lips 171 overhanging the opposite top edges of the journal box to ensure stability of the bearing in resisting forces thereon at right angles to the axis of the box—considering the axis thereof as coincident with that of the axle 113. The bearing is held in place longitudinally of the axis of the journal box in a manner hereinafter to appear.

The bifurcated legs 141 of the U-shaped brake-supporting structures 140 are not directly pivoted to the journal boxes but are interlocked with the upstanding flanges 172 on the bearings 117, as at 173, at opposite sides of the swing hangers 124 and the whole assembly seated between upstanding lugs 174 on the journal boxes, whereby the bearings 117 are prevented from moving relatively to the boxes; and the bifurcated arms 141, with attached cross members 145 and the brake rigging supported therefrom, are caused to move with the journal boxes during every lateral movement of the wheels and axles. The brake rigging is of the same type and supported from the cross members 145 in the same manner as described in connection with the construction first referred to. The bifurcated legs 141 are each welded to cross members 145, as in the construction previously described, and are provided with arcuate lower surfaces 175 at the journal box position for rocking engagement thereon, and on their upper surfaces provide recesses 176 for engagement by depending lugs 177 in the interlocking grooves 173 of the swing hanger bearings 117 to prevent sliding movement of the members 141 relative to the journal boxes and bearings 117. It will be seen that as the truck frame moves vertically relatively to the wheels and journal boxes in response to springing movements, the members 141 will work about the lugs 177 as fulcrums and rock on the journal boxes, thereby to maintain the brake rigging in proper relation to the wheels at all times.

The U-shaped brake-supporting structures 140 are supported on the truck frame by hangers permitting lateral movement of such structures and accommodating the longitudinal displacement necessary as the cross members 145 move through the arc described by the leg members 141 in response to vertical springing movements of the truck frame. Hangers 178 are suspended between jaws 179 of brackets 180 on the truck frame by means of bolts 181 passing through the jaws and hangers and secured by nuts 182. The hangers are disposed in pairs at opposite sides of the transom 111 in position to support each of the cross members 145 at each side of the truck. The cross members have a sliding fit through the lower end of hangers 178, as at 183, and swing with the hangers as the leg members 141 fulcrum about the relatively fixed points 177 in response to vertical displacement of the truck frame, whereby such motion is imparted to the cross members 145 in a general longitudinal direction. The cross members pass entirely through the brackets 180, which are arcuately slotted as at 184, to permit of such longitudinal movement of the cross members without interference. It will be understood, of course, that longitudinal displacement of the members 145 also occurs because of play between the journal box and pedestals. It will also be understood that in either event the longitudinal displacement is only of a slight degree. The brackets 180 are fixed with respect to the truck frame, and the cross members 145 have a sliding motion through both the brackets and hangers 178 in response to lateral movement of the wheels and axles.

The brackets 180 are in two parts, 185 and 186, separable on a horizontal line coincident with the center of the cross members 145 passing therethrough, and are secured together by means of bolts 187 and nuts 188. By this means, the assembled U-shaped structures 140 may be laid in the members 185 and the members 186 then bolted in place. The members 185 are illustrated as separate from the truck frame and secured thereto by welding, as at 189; but, if found expedient, these may just as well be made integral with the frame.

While the brake-supporting structure has been described as supported in anti-friction rollers or hangers on the truck frame, it is to be understood that the mechanism might be supported in other ways not departing from the spirit of the invention. The supporting structure may be carried in proper bearings on the truck frame for direct sliding engagement, if desired, or any other means permitting lateral motion but resisting braking reactions.

What is claimed is:

1. A vehicle truck including a truck frame, wheeled axles including journal boxes movable laterally with respect to the truck frame, brake rigging for said truck, and means for supporting said rigging comprising members pivotally supported in horizontal axes on said journal boxes and supported on said truck frame for lateral movement relative thereto.

2. A vehicle truck including a truck frame, wheeled axles including journal boxes movable laterally with respect to the truck frame, brake rigging for said truck, and means for supporting said rigging comprising generally U-shaped members having the legs thereof pivotally supported on said journal boxes and cross members connecting said legs supported on said truck for relative lateral movement.

3. A vehicle truck including a truck frame having pedestals, wheeled axles having journal boxes disposed between said pedestals and movable laterally with respect to said truck frame, brake rigging for said truck, and means for supporting said brake rigging comprising generally U-shaped structures having spaced bifurcated legs straddling the respective pedestals and pivotally supported on said journal boxes and cross members connecting said legs and supported on said truck frame for relative lateral movement.

4. A vehicle truck including a truck frame having side frames and a connecting transom, wheeled axles supporting said truck frame and movable laterally relatively thereto, journal boxes on said axles, brake rigging for said truck, and means for supporting said brake rigging comprising generally U-shaped structures having spaced bifurcated leg members straddling said side frames and pivotally connected with the respective journal boxes and cross members connecting said leg members and supported on said transom for lateral movement relative to said truck frame.

5. A vehicle truck including a truck frame, wheels and axles supporting said truck frame and movable laterally relatively thereto, journal boxes on said axles, means for supporting a brake rigging from said truck for movement laterally with said wheels and axles comprising generally U-shaped structures having spaced leg members pivotally connected to said journal boxes and cross members connecting said leg members and supported from said truck frame for relative lateral movement, and brake rigging supported from said cross members.

6. A vehicle truck including a truck frame, wheels and axles supporting said truck frame and movable laterally relatively thereto, journal boxes on said axles, means for supporting a brake rigging from said truck for movement laterally with said wheels and axles comprising generally U-shaped structures having spaced leg members pivotally connected to said journal boxes and cross members connecting said leg members, roller members on said truck frame supporting said cross members for relative lateral movement, and brake rigging supported from said cross members.

7. A vehicle truck including a truck frame, wheels and axles supporting said truck frame and movable laterally relatively thereto, journal boxes on said axles, means for supporting a brake rigging from said truck for movement laterally with said wheels and axles comprising generally U-shaped structures having spaced leg members supported on said journal boxes and cross members connecting said leg members, swing hanger members on said truck frame supporting said cross members for relative lateral movement, and brake rigging supported from said cross members.

8. A vehicle truck including a truck frame, wheels and axles supporting said truck frame and movable laterally relatively thereto, journal boxes on said axles, means for supporting a brake rigging from said truck for movement laterally with said wheels and axles comprising generally U-shaped structures having spaced leg members supported on said journal boxes and cross members connecting said leg members, swing hanger members on said truck frame supporting said cross members for relative lateral movement and longitudinal displacement, and brake rigging supported from said cross members.

WILLIAM H. MUSSEY.